US012046742B2

(12) United States Patent
Claude et al.

(10) Patent No.: US 12,046,742 B2
(45) Date of Patent: Jul. 23, 2024

(54) DEVICE FOR ROLLING A METAL LITHIUM BAND

(71) Applicants: COMMISSARIAT A L'ENERGIE ATOMIQUE ET AUX ENERGIES ALTERNATIVES, Paris (FR); REDEX, Ferrieres-en-Gatinais (FR)

(72) Inventors: Guillaume Claude, Grenoble (FR); Céline Barchasz, Grenoble (FR); Clément Coraboeuf, Pannes (FR); Lionel Blanc, Grenoble (FR)

(73) Assignees: COMMISSARIAT A L'ENERGIE ATOMIQUE ET AUX ENERGIES ALTERNATIVES, Paris (FR); REDEX, Ferrieres-en-Gatinais (FR)

( * ) Notice: Subject to any disclaimer, the term of this patent is extended or adjusted under 35 U.S.C. 154(b) by 199 days.

(21) Appl. No.: 17/574,795

(22) Filed: Jan. 13, 2022

(65) Prior Publication Data
US 2022/0223832 A1    Jul. 14, 2022

(30) Foreign Application Priority Data
Jan. 14, 2021   (FR) ..................... 21 00340

(51) Int. Cl.
*B21B 3/00*   (2006.01)
*H01M 4/04*   (2006.01)

(52) U.S. Cl.
CPC ............. *H01M 4/0435* (2013.01); *B21B 3/00* (2013.01)

(58) Field of Classification Search
CPC ....... B21B 1/38; B21B 3/00; B21B 2001/383; B21B 47/04
USPC .............................................. 29/17.4; 72/363
See application file for complete search history.

(56) References Cited

U.S. PATENT DOCUMENTS

| 2,434,558 | A | * | 1/1948 | Gage .................. B21B 1/40 29/17.2 |
| 3,721,113 | A |   | 3/1973 | Hovsepian |
| 3,783,666 | A |   | 1/1974 | Rosansky et al. |
| 6,722,002 | B1 | * | 4/2004 | Chang ................ B21B 3/00 148/426 |

FOREIGN PATENT DOCUMENTS

| CN | 110010844 A | 7/2019 |
| EP | 0 147 929 A1 | 7/1985 |

OTHER PUBLICATIONS

French Preliminary Search Report issued Oct. 13, 2021 in French Application 21 00340 filed on Jan. 14, 2021, 2 pages (with English Translation of Categories of Cited Documents).

* cited by examiner

*Primary Examiner* — Teresa M Ekiert
(74) *Attorney, Agent, or Firm* — Oblon, McClelland, Maier & Neustadt, L.L.P.

(57) ABSTRACT

A device for manufacturing a lithium band including a rolling area including two rolling cylinders, a feed-in area including a device for feeding in the rolling area with a lithium band with a first thickness, a device for feeding in two films interposed between the lithium band with a first thickness and a rolling cylinder, and a storage area including a device for collecting a lithium band having a second thickness. The lithium band with a second thickness is tensioned and rolls ensure a separation of each film off the surface of one of the rolling cylinders in a separation area located beyond a horizontal plane passing through the axis of rotation of the rolling cylinder and located opposite to the other rolling cylinder.

10 Claims, 2 Drawing Sheets

DEVICE FOR ROLLING A METAL LITHIUM BAND

TECHNICAL FIELD AND BACKGROUND OF THE INVENTION

The present invention relates to a device for rolling a metal lithium band.

To date, the lithium-ion technology allows reaching energy densities in the range of 250 Wh/kg and the progress margin of this technology is low according to specialists. The so-called "all-solid-state" technologies seem to be the future of lithium-ion in particular with the use of metal lithium at the anode. Indeed, the mass and volume energy densities of this material are very high and, if these technologies develop, would allow considerably increasing the energy density of rechargeable batteries.

Hence, one of the major concerns relates to mastering of the process of manufacturing metal lithium bands, used in large amounts in metal lithium batteries to date, thereby limiting the energy densities. The targeted thicknesses, in the range of a few microns to a few tens of microns, are reached thanks to a rolling mill.

Metal lithium is a malleable, sticky and therefore very fragile material, the manufacture of bands of a few tens of m is then relatively complex. Hence, it is necessary to optimise all of the rolling parameters to master the process and thus produce bands of a few tens of μm.

In general, the rolling cylinders are made of metal. In order to avoid sticking of the lithium on the rolling cylinders, a polymer material film is interposed between each rolling cylinder and metal lithium. An example of such a manufacturing device is described in the document U.S. Pat. No. 3,783,666, wherein endless belts of polyvinyl or polyethylene are wound around the rolling cylinders. This device enables the manufacture of a metal lithium film in the range of 250 μm.

The document EP0692831 describes a device for rolling lithium bands allowing reaching thicknesses of a few tens of μm, however it requires the implementation of a rolling lubricant.

DISCLOSURE OF THE INVENTION

Consequently, it is an aim of the present invention to provide a device for dry rolling a metal lithium band, i.e. without any liquid lubricant input.

The above-mentioned aim is achieved by a rolling device including at least two rolling cylinders between which the metal lithium is intended to be rolled, means for feeding in a metal lithium film at the input of the rolling mill disposed upstream of rolling cylinders, means for storing a metal lithium film at the output of the rolling mill, said storage means being disposed downstream of the rolling cylinders. The device applies a tension on the lithium film at the output of the rolling mill so that it is mechanically tensioned. The device also includes means for circulating two plastic material films disposed so as to interpose a plastic material film between each rolling cylinder and the lithium film and to make said films run with the lithium film.

The inventors have determined that there was a range of detachment angle of the film and of the band allowing making a metal lithium film with a second thickness of a few tens of μm while reducing, and even suppressing, the risk of tearing of the film and without the addition of a liquid lubricant. This angle range is obtained by particular orientations of each plastic material film downstream of the rolling cylinders.

The particular orientation of the plastic films is such that the separation line between a plastic material film and the lithium film is located in an area beyond a horizontal plane passing through the axis of rotation of the rolling cylinder with which the plastic material film is in contact.

Lithium films with a thickness of a few tens of am, for example between 10 μm and 100 μm, without any tearing could be obtained, without the implementation of a lubricant that might have contaminated the metal lithium.

Advantageously, the separation line is located in an area located between the horizontal plane and a vertical plane passing through the axis of rotation of the cylinder.

Preferably, the specific tension applied to the plastic films is comprised between 0.1 N/mm and 0.6 N/mm, preferably this tension is comprised between 0.2 N/mm and 0.3 N/mm. The application of this specific tension, associated to the orientation of one or several plastic material film(s) with respect to the rolling roll(s) allows facilitating the detachment between the plastic films and the lithium film with a second thickness.

For example, the particular orientation of each plastic material film is obtained by a roll with an axis of rotation parallel to the axis of rotation of the rolling cylinder, the plastic material film passing between the rolling cylinder and the roll.

Advantageously, the plastic material film includes a silicone coating.

One of the objects of the present application is a device for rolling a metal lithium band including a rolling area comprising at least two rolling cylinders between which a lithium band with a first thickness is intended to pass, each rolling cylinder rotating about an axis of rotation, a feed-in area comprising means for feeding in the rolling area with the lithium band with a first thickness, means for feeding in two plastic material films so that each plastic material film is interposed between the lithium band with a first thickness and a rolling cylinder, called associated rolling cylinder, and a storage area including means for collecting a lithium band with a second thickness having a second thickness smaller than the first thickness. The device also includes means for tensioning the lithium band with a second thickness and means configured to ensure a separation of each plastic material film off the surface of one of the rolling cylinders on the storage area side in a separation area located beyond a horizontal plane passing through the axis of rotation of said rolling cylinder and located opposite the other rolling cylinder, said separation area including said horizontal plane (PH).

Preferably, the means applying a tension to the lithium band with a second thickness are configured to apply a tension per unit surface area of the cross-section of the film with a second thickness between 1 $N/mm^2$ and 1.4 $N/mm^2$.

Still preferably, the rolling device includes means configured to apply a tension to the plastic material films at least in the storage area, said means being configured to apply a tension per unit width of the plastic material films between 0.1 N/mm and 0.6 N/mm.

Advantageously, the separation means include, for each plastic material film, a roll whose axis of rotation is parallel to that of the associated rolling cylinder and whose axis of rotation is located in the separation area.

Advantageously, the position of the roll in the separation area is modifiable.

The plastic material films may include a silicone coating at least over the face intended to be in contact with lithium.

For example, the plastic material films are made of poly(ethylene terephthalate).

The plastic material films may be in the form of endless belts, their tension being set by a tensioner roll.

According to an additional feature, the rolling device includes in the storage area a spindle around which the lithium band with a second thickness is wound and means for simultaneously winding a plastic material film so as to avoid sticking of the lithium band with a second thickness on itself.

According to an additional feature, the rolling device includes two actuators for driving in rotation each rolling cylinder separately and a control unit configured to control the two actuators so that the two rolling cylinders rotate at different speeds (V1, V1).

BRIEF DESCRIPTION OF THE DRAWINGS

The present invention will be better understood based on the following description and the appended drawings wherein.

DETAILED DISCLOSURE OF PARTICULAR EMBODIMENTS

Figure 1:
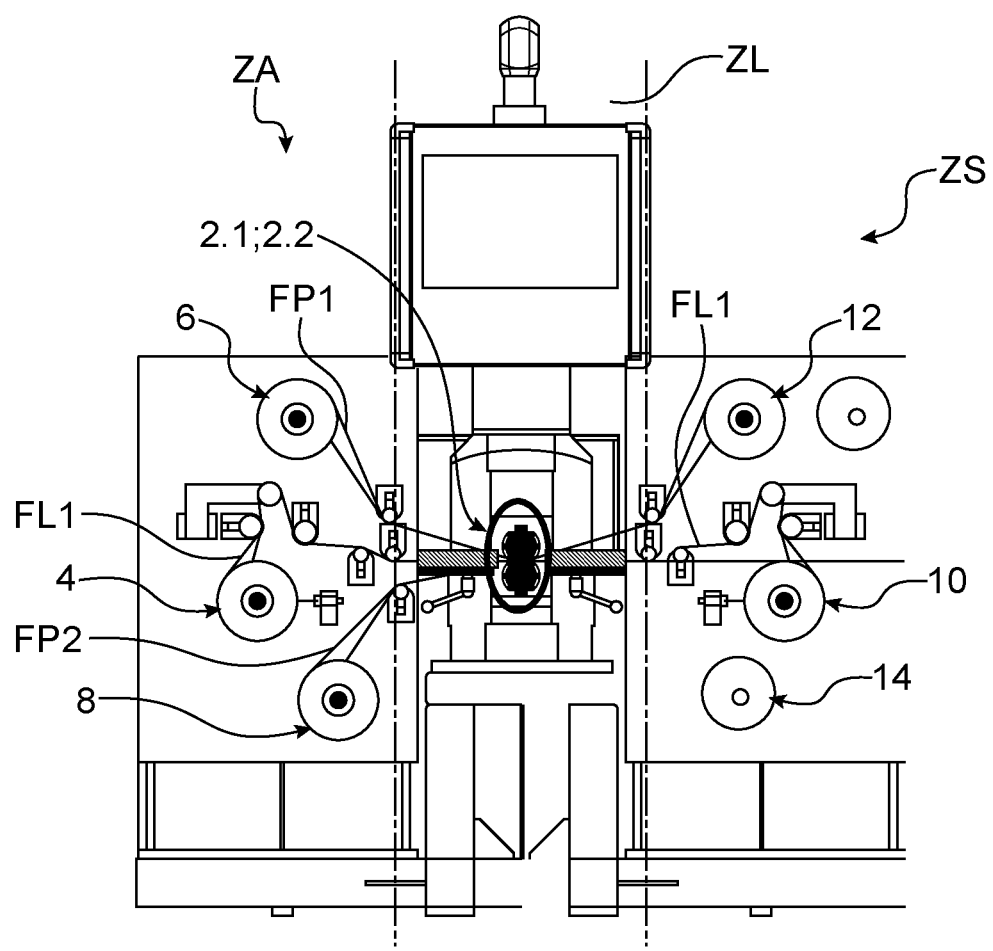
FIG. 1 is a schematic representation of a device for rolling a lithium film by a rolling process.

In FIG. 1, is shown a device for rolling a lithium film, also called band, including an area ZL for rolling the lithium, an area ZA for feeding in lithium upstream of the rolling area ZL, an area ZS for storing the lithium downstream of the rolling area ZL.

In the present application, the upstream-downstream direction should be understood from the feed-in area towards the storage area.

In the present application, the expressions "lithium film" and "metal lithium film" refer to a film made of lithium or of a lithium alloy, comprising for example and without limitation magnesium and/or aluminium . . . .

The rolling area includes at least two rolling cylinders 2.1, 2.2 opposite each other, the opposing external surfaces of the cylinders being separated by the desired thickness of the lithium film. Several pairs of rolling cylinders disposed one after another from upstream to downstream may be implemented for example to progressively lower the thickness of the lithium film. The rolling cylinders are driven in rotation by actuators, such as electric motors.

The plane in which the lithium film runs between the two rolling cylinders will be called "rolling plane".

The feed-in area ZA includes a dispenser 4 of a metal lithium film FL1 with a first thickness e1. For example, the film is obtained by extrusion and as for example a thickness in the range of 200 μm. The film is wound on the dispenser. Rolls and guides generally implemented in rolling mills ensure guidance of the film FL1 with a first thickness up to the rolling area ZL.

The feed-in area ZA also includes a dispenser 6 of a first plastic material film FP1, a portion of the film FP1 being intended to be interposed between the rolling cylinder 2.1 and the lithium film FL1 with a first thickness and to be in contact with the rolling cylinder 2. The feed-in area ZA also includes a dispenser 8 of a second plastic material film FP2, the film FP2 being intended to be interposed between the rolling cylinder 2.2 and the lithium film FL1 with a first thickness. Rolls and guides may be implemented to guide the plastic material films FP1 and FP2 up to the rolling area.

Each plastic material film FP1, FP2 is associated to a rolling cylinder 2.1, 2.2 respectively. The storage area ZS includes a spindle 10 on which the metal lithium film FL1 with a second thickness smaller than the first thickness is wound, a spindle 12 on which the plastic material film FP1 is wound and a spindle 14 on which the plastic material film FP2 is wound. Rolls and guides may be implemented to guide the lithium films FL1 with a second thickness, the plastic material films FP1 and FP2 from the rolling area towards their storage spindle.

The dispensers and the spindles are driven in rotation by actuators, such as electric motors.

The elements of the feed-in area and of the storage area, in particular the dispenser 4 and the dispensers 6, 8 and the spindles 12, 14, are controlled so that the lithium film at the input of the rolling mill and the plastic material films FP1, FP2 have close or equal speeds of displacement. The speed of the spindle 10 of the lithium film at the output of the rolling mill is different from the speed of the dispensers 4, 6 and 8 and of the spindles 12, 14.

The axes of the spindles, rolls, cylinders are parallel to each other and normal to the direction of displacement of the films.

Advantageously, a plastic material film is wound at the same time as the film FL1 with a second thickness on the spindle 10 so that the windings of the film FL1 with a second thickness are separated by a plastic material film, for example made of polypropylene.

As example for a lithium film comprised between 60 mm and 100 mm, the tightening force exerted on the lithium strip by the rolling cylinders is for example comprise between 10 kN and 23 kN. For example, this force is exerted by the rolling cylinder 2.1.

Figure 2:
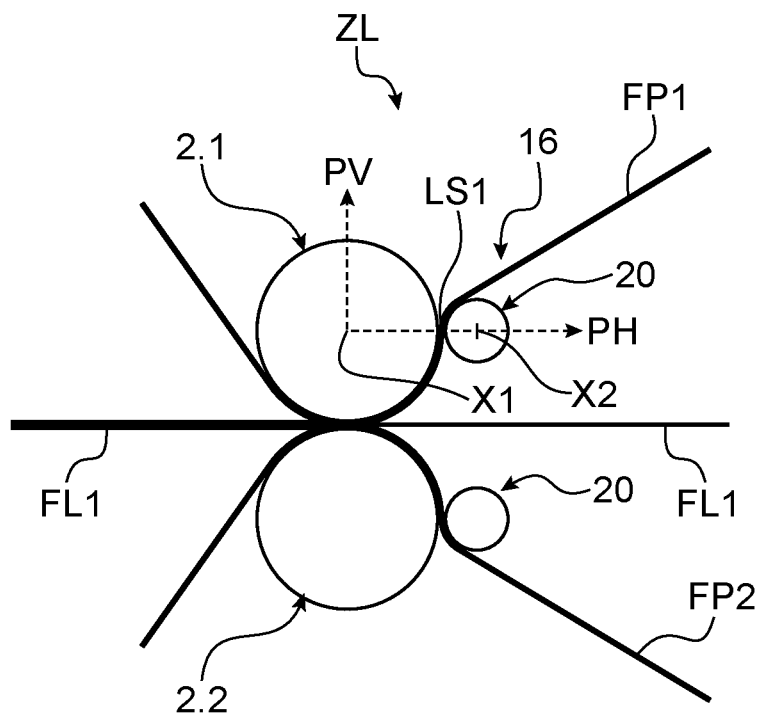
FIG. 2 is a detail view of a device for rolling a metal lithium film according to one embodiment.

In FIG. 2, is shown a detail view of a device D1 for manufacturing a metal lithium film according to a first embodiment.

In addition to the elements of the device of FIG. 1, the device D1 comprises separation means 16 allowing setting the separation area between the film FP1 and the external surface of its associated rolling cylinder 2.1, and separation means allowing setting the separation area between the film FP2 and its associated rolling cylinder 2.2.

The means for separating the films FP1, FP2 being similar or identical, only the means 16 will be described in detail.

The separation area is materialised by a separation line LS1 that is formed by a generatrix of the rolling cylinder. In FIG. 2, this line is symbolised by a point.

Indeed, the inventors have determined that by setting the position of the separation line in a given area, a lithium film FL1 with a second thickness with a thickness of a few tens of μm, for example between 50 μm and 30 μm, could be obtained while limiting the risks of tearing of the film FL1 with a second thickness, and without the need for bringing in liquid at the level of the rolling cylinders.

The inventors have determined that a separation line lying in an area located above a horizontal plane PH passing through the axis of rotation X1 of the rolling cylinder 2.1 allowed facilitating the detachment between the plastic material film and the lithium film, thereby substantially reducing the risk of tearing of a lithium film FL1 with a second thickness with a thickness of a few tens of μm. The horizontal plane PH is parallel to the rolling plane.

Advantageously, the area is also delimited by a vertical plane PV passing through the axis of rotation of the rolling cylinder 2.1. Preferably, the separation line is located in an area delimited between a plane directed at 45° with respect to the vertical plane and the vertical plane in the counterclockwise direction.

In the represented example and advantageously, the means 16 include a roll 20 disposed between the rolling cylinder 2.1 and the spindle 12 on which the plastic material film FP1 is wound, and whose axis of rotation X2 and in the horizontal plane PH. The roll 20 is disposed on the route of the film FP1 between the rolling cylinder and the spindle 12 so that the separation line LS1 is in the plane PH. It is considered that the separation line LS1 and the axis of rotation of the roll 20 are substantially in the same plane containing the axis of rotation of the rolling cylinder.

The plastic material film FP1 runs between the rolling cylinder 2.1 and the roll 20.

Alternatively, the spindle 12 and the rolls and guides of the plastic material film FP1 in the storage area are disposed with respect to the rolling cylinder 2.1 so that the separation line LS1 is in the plane PH.

The implementation of a roll 20 allows setting the position of the line LS1 more accurately.

For example, the distance separating the surface of the rolling cylinder and the surface of the roll is comprised between 1 mm and 4 mm.

The lithium film FL1 with a second thickness is kept under mechanical tension. Preferably, a specific tension is between 1 N/mm$^2$ of lithium film section and 1.4 N/mm$^2$ of lithium film section is applied. A specific tension in the range of 1 N/mm$^2$ is preferably applied to a pure or almost pure lithium film, and a specific tension in the range of 1.4 N/mm$^2$ is preferably applied to a lithium alloy film.

For example, for a lithium film having a section of 3 mm$^2$ (for example 60 mm wide and 50 µm thick), the applied force is comprised between 3 N (for a specific tension of 1 N/mm$^2$) and 4.2 N (for a specific tension of 1.4 N/mm$^2$).

The mechanical tension applied to the plastic material films FP1 and FP2 downstream of the rolling area depends on the width of the films. Preferably, the specific tension is comprised between 0.1 N/mm and 0.6 N/mm, preferably this tension is comprised between 0.2 N/mm and 0.3 N/mm, which facilitates even more the detachment and contributes to the suppression of the apparition of tearing of the lithium film FL1 with a second thickness.

For example, the tension of the film FL1 with a second thickness and the tensions of the plastic material films downstream of the rolling area are set by adjusting the speed and the torque of motors.

Quite advantageously, the plastic material films include, at least over a face intended to come into contact with the lithium film, a silicone coating reducing the risks of sticking between the lithium and the plastic material film. For example, the coating has a thickness of 100 nm.

Silicone has the advantage of leaving no residue after rolling. Indeed, no silicone trace has been detected on the film FL1 with a second thickness.

For example, the plastic material films are made of poly(ethylene terephthalate) covered with a solid silicone layer, for example of a few tens of nanometres, over at least one face. For example, the thickness of the plastic material films is comprised between 15 µm and 100 µm.

Advantageously, the roll 20 has a modifiable position with respect to the rolling cylinder in particular its angular position, allowing adapting the device easily to the manufacture of films with different thicknesses while limiting the risks of tearing.

Alternatively, the plastic material films consist of closed loops forming endless belts, which allows avoiding having to manage the plastic material film length remaining in the feed-in area. For example, the tension of the plastic material films is set by means of a tensioner roll.

The invention allows reaching lithium film thicknesses of 30 µm without any tearing. In contrast, it has been noticed that by placing the roll 20 underneath the horizontal plane PH, films having at least a thickness of 60 µm were torn.

Figure 3:
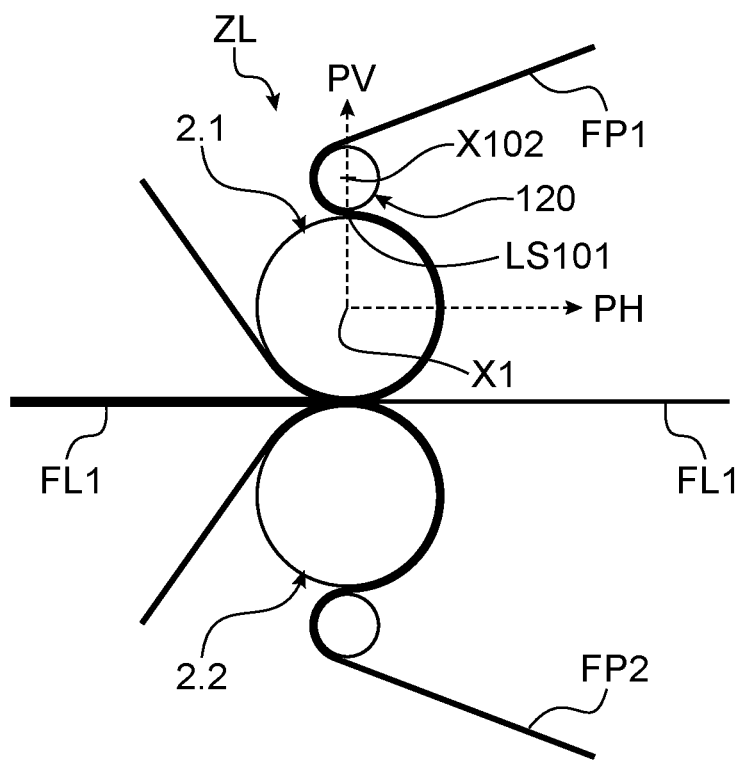
FIG. 3 is a detail view of a device for rolling a metal lithium film according to another embodiment.

In FIG. 3, is shown another example of a device for rolling a lithium film which differs from that of FIG. 2, in that the separation line of the plastic material film and of the associated rolling cylinder is located substantially in a vertical plane passing through the axis of rotation of the rolling cylinder.

In the represented example and advantageously, the means 116 include a roll 120 which is disposed between the rolling cylinder 2.1 and the spindle 12 on which the plastic material film FP1 is wound, and whose axis of rotation X102 is in the vertical plane PV. The roll 120 is disposed on the route of the film FP1 between the rolling cylinder and the spindle 12 so that the separation line LS101 is substantially in the plane PV. It is considered that the separation line LS101 and the axis of rotation of the roll 120 are substantially in the same plane containing the axis of rotation of the rolling cylinder.

The separation line of each of the plastic material films could be located beyond the vertical plane when considering the counterclockwise direction. The location of the separation line could depend on the relative arrangement of the different elements of the rolling device and on the available space.

In the examples of FIGS. 2 and 3, the positionings of the separation rolls for the two plastic material films are symmetrical with respect to the rolling plane.

Alternatively, their positioning could be asymmetrical, and the separation lines could also be located asymmetrically with respect to the rolling plane.

Also, different means for setting the location of the separation line between the plastic material film and the associated rolling cylinder could be different between the plastic material films.

In a particularly advantageous operating mode, the actuators of each of the rolling cylinders are driven independently of each other so as to make them rotate at different speeds, in order to create a speed difference between them, which allows promoting sticking of the lithium film on the upper or lower plastic film.

Preferably, the difference between the speed V1 of the upper rolling cylinder 2.1 and the speed V2 of the lower rolling cylinder 2.2 is comprised between:

$$-30\% \leq (V2-V1)/V1 \leq 30\%.$$

The invention claimed is:

1. A device for rolling a metal lithium band, the device comprising:
   at least two rolling cylinders, located in a rolling area, between which the metal lithium band, having a first thickness, passes, each rolling cylinder rotating about an axis of rotation,
   first means for feeding, into the rolling area, the metal lithium band with the first thickness,
   second means for feeding, into the rolling area, two plastic material films so that each plastic material film is interposed between the metal lithium band and one of the rolling cylinders, the first and second means for feeding each including a roller, and means for collecting the metal lithium band in a storage area, the metal lithium band having a second thickness smaller than the first thickness after passing through the at least two rolling cylinders, wherein the device further includes at least one roller configured to tension the metal lithium band, and separation means including a roller, for each plastic material film, configured to separate each plastic material film off a surface of one rolling cylinder of the at least two rolling cylinders in the storage area side in a separation area located beyond a horizontal plane passing through the axis of rotation of the one rolling cylinder, and located opposite another of the at least two rolling cylinders, said separation area including said horizontal plane.

2. The rolling device according to claim 1, wherein the at least one roller configured to tension the metal lithium band is configured to apply a tension per unit surface area of the cross-section of the film with a second thickness between 1 N/mm² and 1.4 N/mm².

3. The rolling device according to claim 1, further comprising means for applying a tension to the plastic material films at least in the storage area, said means for applying the tension being configured to apply a tension per unit width of the plastic material films between 0.1 N/mm and 0.6 N/mm.

4. The rolling device according to claim 1, wherein each roller of the separation means has an axis of rotation that is parallel to that of the associated rolling cylinder of the at least two rolling cylinders and whose axis of rotation is located in the separation area.

5. The rolling device according to claim 4, wherein position of each roller of the separation means is modifiable.

6. The rolling device according to claim 1, wherein the plastic material films include a silicone coating at least over a face to be in contact with the metal lithium band.

7. The rolling device according to claim 1, wherein the plastic material films are made of poly(ethylene terephthalate).

8. The rolling device according to claim 1, wherein the plastic material films are in a form of endless belts, a tension of the plastic material films being set by a tensioner roll.

9. The rolling device according to claim 1, further comprising a spindle around which the lithium metal band having the second thickness is wound, and at least one roller configured to simultaneously wind a plastic material film so as to avoid sticking of the lithium metal band on itself.

10. The rolling device according to claim 1, further comprising two actuators configured to drive in rotation each of the at least two rolling cylinders separately, and control circuitry configured to control the two actuators so that the at least two rolling cylinders rotate at different speeds.

* * * * *